W. T. PEYTON.
SPRING TIRE.
APPLICATION FILED FEB. 9, 1915.

1,170,322.

Patented Feb. 1, 1916.

Witnesses
J. H. Crawford
Wm. A. Smith

Inventor
W. T. Peyton,
By Victor J. Evans
Attorney

THE COLUMBIA PLANOGRAPH CO., WASHINGTON, D. C.

UNITED STATES PATENT OFFICE.

WILLIAM T. PEYTON, OF WEISER, IDAHO.

SPRING-TIRE.

1,170,322.  Specification of Letters Patent.  Patented Feb. 1, 1916.

Application filed February 9, 1915. Serial No. 7,049.

*To all whom it may concern:*

Be it known that I, WILLIAM T. PEYTON, a citizen of the United States, residing at Weiser, in the county of Washington and State of Idaho, have invented new and useful Improvements in Spring-Tires, of which the following is a specification.

This invention relates to spring tires and more particularly to an adjustable means for securing the tire to a rim.

An object of the invention is to construct the tire of resilient wire having portions thereof flat so as to allow for the differences in size between the inner periphery of the tire and the outer periphery.

Another object of the invention is the provision of a tire wherein the adjustable means thereof for securing the tire to the rim can be operated exteriorly with respect to the interior of the tire.

Figure 1:
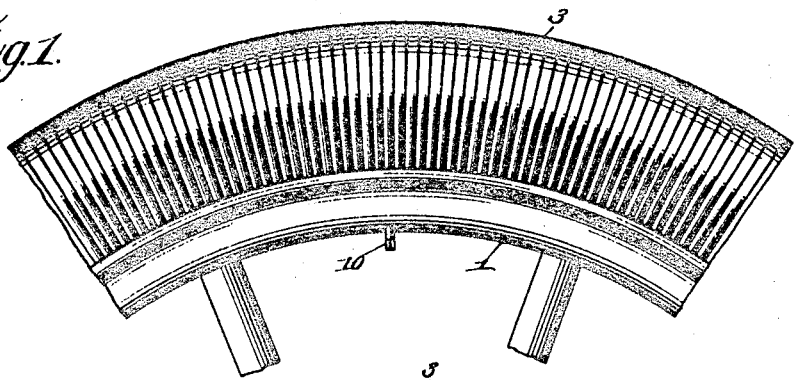
Figure 2:
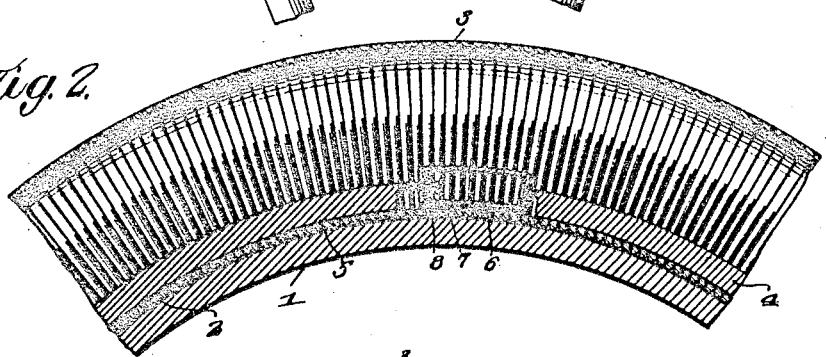
Figure 3:
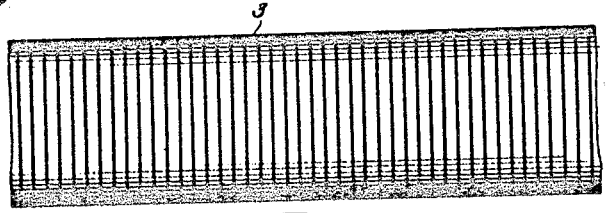
Figure 4:
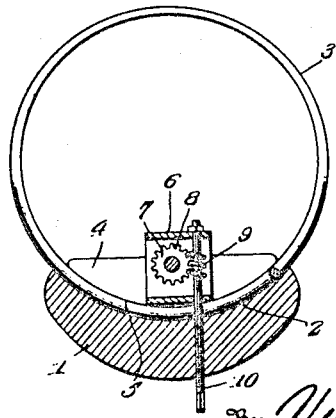

The invention consists in the features of construction, combination, and arrangement of parts, hereinafter fully described and claimed, reference being had to the accompanying drawings, in which:

Figure 1 is a fragmentary side elevation of the tire showing it applied to the rim of a wheel. Fig. 2 is a longitudinal section therethrough. Fig. 3 is a detail top plan view of a portion thereof. Fig. 4 is a cross section.

Referring to the drawing, the numeral 1 designates the rim of the tire having formed therein a peripheral groove 2 in which seats a portion of a tire member 3 formed of resilient wire flattened at intervals so as to provide a substantially inclosed tread portion. Contacting with the inner surface of that portion of the tire member that seats in the groove is a band 4 having a convex under surface 5 so as to tightly engage the convex inner surface of the tire member. The ends of the band are spaced a slight distance apart and as shown are connected by a yoke 6, one extremity being fixed with relation to one end of the band, the remaining end being adjustable with respect to the remaining end of the band. That extremity that passes through the movable extremity of the yoke is screw threaded so as to coöperate with the threaded bore of a nut 7 that has its outer surface provided with a worm thread 8 coöperating with the worm 9 formed upon a shaft 10. One extremity of the shaft 10 projects exteriorly of the rim and as shown, is squared so that an instrument can take hold for rotating the shaft.

From the foregoing description, it will be seen that a tire can be readily set into place and thus subsequently tightened by manipulating the shaft 9 that in turn operates the nut for drawing the ends of the band closer together.

What is claimed is:—

A spring tire comprising in combination with a grooved rim, a tire member formed of a coil spring having a portion seated in the groove, an annular band engaging the inner surface of that portion of the tire which seats in said groove, a yoke having one extremity fixed to one end of said band and its remaining extremity adjustable with respect to the remaining end of said band, a nut adjustably mounted on one end of said band and engaging the adjustable end of said yoke, and a worm shaft passing radially through said rim and having a squared portion arranged exteriorly thereof and further projection through said yoke and coöperating with said nut whereby the latter may be adjusted upon the end of said band, said yoke frictionally engaging said nut at all times and forming a support for said shaft.

In testimony whereof I affix my signature in presence of two witnesses.

WILLIAM T. PEYTON.

Witnesses:
W. E. ADAMS,
O. M. HARVEY.

Copies of this patent may be obtained for five cents each, by addressing the "Commissioner of Patents, Washington, D. C."